United States Patent [19]

Inoue

[11] Patent Number: 4,484,645

[45] Date of Patent: Nov. 27, 1984

[54] COMBINATION WEIGHING MACHINE WITH ARTICLE FEED CONTROLLED BY AVERAGE WEIGHT OF ARTICLES IN NON-SELECTED WEIGHING MACHINES

[75] Inventor: Shinichi Inoue, Kobe, Japan

[73] Assignee: Yamato Scale Company, Limited, Japan

[21] Appl. No.: 467,498

[22] Filed: Feb. 18, 1983

[51] Int. Cl.³ .................... G01G 19/22; G01G 19/32; G01G 13/24

[52] U.S. Cl. ........................................ 177/25; 177/50; 177/114

[58] Field of Search ........................ 177/25, 50, 114

[56] References Cited

U.S. PATENT DOCUMENTS

| | | | |
|---|---|---|---|
| 2,688,459 | 9/1954 | Merrill et al. | 177/50 |
| 3,477,529 | 11/1969 | Burn et al. | 177/50 |
| 3,862,666 | 1/1975 | Muskat et al. | 177/50 |
| 3,939,928 | 2/1976 | Murakami et al. | 177/25 |
| 4,267,894 | 5/1981 | Hirano et al. | 177/25 |
| 4,308,928 | 1/1982 | Oshima | 177/25 |
| 4,313,507 | 2/1982 | Hays | 177/25 |
| 4,336,852 | 6/1982 | Hirano | 177/25 |
| 4,336,853 | 6/1982 | Hirano | 177/25 |
| 4,341,274 | 7/1982 | Hirano et al. | 177/25 |
| 4,344,492 | 8/1982 | Hirano | 177/25 |
| 4,388,975 | 6/1983 | Hirano | 177/25 |

Primary Examiner—E. A. Goldberg
Assistant Examiner—Patrick W. Foster
Attorney, Agent, or Firm—Senniger, Powers, Leavitt and Roedel

[57] ABSTRACT

An automatically controlled combination weighing machine, which is generally used for packing a plurality of articles in each bag or the like so that each bag contains a predetermined weight of articles, the machine possesses a plurality of weighing units for weighing a plurality of articles each at the same time to produce corresponding weight indicative signals, respectively, arithmetic means for selecting some of these weighing units so that the total weight of the articles on the selected weighing units meets a predetermined qualification, and means for unloading and loading the selected weighing units with articles automatically. An automatic control device is provided for the loading means for controlling the feeding rate or amount of the articles to the unloaded weighing units on the basis of the average weight of the articles on the remaining non-selected weighing units so that all of the weighing units can uniformly participate in the selected combinations and be unloaded in turn.

3 Claims, 4 Drawing Figures

COMBINATION WEIGHING MACHINE WITH ARTICLE FEED CONTROLLED BY AVERAGE WEIGHT OF ARTICLES IN NON-SELECTED WEIGHING MACHINES

This invention relates to an improvement in combination weighing machine having automatic article feeding or loading device.

The weighing machine, which is generally referred to as "combination balance", "combination weighing device" or "combination weighing machine", is used for extracting a plurality of articles from a group of articles, such as candies, fruits and vegetables, having relatively large variances in respective weights, to form a subgroup having a total weight which meets a predetermined qualification, for example, which falls within a predetermined range of weight. Typical examples of such machines are disclosed in U.S. Pat. Nos. 3,939,928 and 4,267,894 which are cited as references. In these devices, a plurality of articles are weighed individually by a plurality of weighing units or balances at the same time, all mathematical combinations of the measured weights are respectively summed and the resultant total weights are successively compared with a predetermined weight qualification. Thus, the combination providing total weight meeting the qualification is selected for use.

Automatically controlled combination weighing machines are generally provided with automatic article loading and unloading mechanisms for discharging the articles from the selected weighing units and then feeding new articles to said units. The loading mechanism is generally composed of a vibration feeder having a plurality of exit gates, as described later, and its article feeding rate can be controlled by varying the opening time of the gates or the amplitude of vibration of the feeder. In the prior art machines, the article feeding rate of the loading mechanism is manually preset for the best results, for example, so that about half of the weighing units are always selected to constitute the best combination for the reason as described in the copending U.S. patent application Ser. No. 277,617 filed June 26, 1981 in the name of T. Hirano. However, due to variances in the respective weights of articles and/or imperfection of gating action, some of the weighing units may be loaded with excessively or abnormally high or low weights. Such abnormal weights are hardly able to participate in the acceptable combinations and, therefore, tend to leave the corresponding weighing units undischarged. Accordingly, these weighing units are unusable for combination operations, thereby reducing working efficiency of the machine significantly. Moreover, when the articles are fresh food, those on the unusable weighing units may be subject to deterioration or putrefaction.

Accordingly, an object of this invention is to provide a novel and improved combination weighing machine which functions automatically to control the article feeding rate of the loading mechanism to enable the abovementioned otherwise unusable weighing units to participate in the subsequent acceptable combinations.

In accordance with this invention, a combination weighing machine having automatic article feeding means also includes presettable feeding rate control means for storing a preset reference weight and controlling the article feeding rate of said article feeding means, averaging means for receiving the weight indicative signals from the weighing units other than those participating in the selected combination and calculating the mean weight thereof every cycle of operation, comparator means for comparing said mean weight with said reference weight to produce a control signal relating the difference therebetween, and correcting means for correcting said article feeding rate of said article feeding means by an amount specified by said control signal.

These and other objects and features of this invention will be described in more detail below with reference to the accompanying drawings.

In the drawings

Throughout the drawings, the same reference numerals are given to corresponding components, and signal conductors indicated in heavy lines conduct quantitative signals, while those indicated in fine lines conduct bilevel signals.

Figure 1:
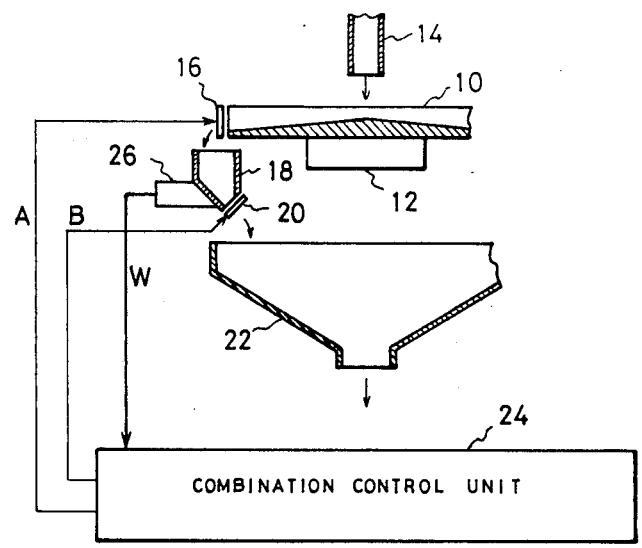
FIG. 1 is a schematic diagram representing a mechanical arrangement of a combination weighing machine in which this invention is embodied.

Referring to FIG. 1, there shown is a schematic view of a mechanical arrangement of a typical automatic combination weighing maching in which this invention is embodied. The machine includes a vibration feeder 10 having a slightly conical bottom wall and a peripheral side wall. The feeder 10 is provided with a vibrator 12 for applying vibration to the bottom wall so that articles supplied from a central chute 14 are shifted outwardly to the peripheral portion. The peripheral wall of the feeder 10 has a plurality of exit ports having a gate 16 each. The gates 16 are normally closed and selectively opened under control of loading signals A from a combination control unit 24 as described later. The machine also includes a plurality of weighing units arranged surrounding the feeder 10 so that their weighing cradles 18 are disposed respectively just under the exit ports of the feeder 10. Only one of the weighing cradles is shown in the drawing for the purpose of simplicity. It is understood that the articles on the feeder 10 are fed into each weighing cradle 18 when the corresponding gate 16 is opened. Each weighing cradle 18 has a bottom opening having a gate 20 which is normally closed and selectively opened under control of unloading signal B from the combination control unit 24 as also described later. Each weighing unit also includes a weight sensor 26, such as a load cell, which produces an electric signal W indicative of the weight of articles in the cradle 18 and supplies it to the combination control unit 24. Under the unloading gates 20 of the respective weighing units, a common collecting hopper 22 is disposed for collecting the articles discharged from the selected weighing units. The articles collected in the hopper 22 and discharged from its bottom opening are transferred by suitable means (not shown) for packing.

Figure 2:
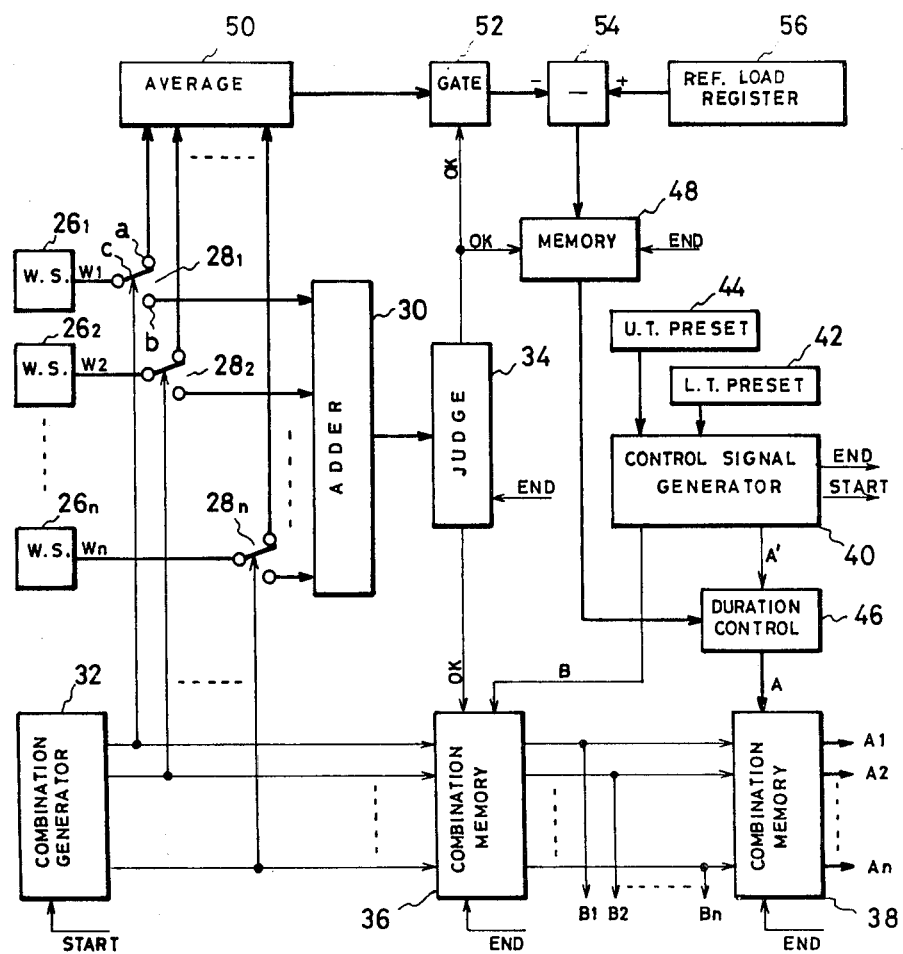
FIG. 2 is a block diagram representing a circuit configuration of an embodiment of the combination weighing machine according to this invention.

FIG. 2 shows a typical circuit configuration of the combination control unit 24 of FIG. 1. The outputs of weight sensors $26_1, 26_2, \ldots 26_n$ are coupled respectively through a plurality of change-over switches $28_1, 28_2, \ldots 28_n$ to an adder circuit 30. Each change-over switch 28 has a pair of switching contacts a and b connected respectively to an averaging circuit 50 and the adder circuit 30, a movable arm c connected to the weight sensor 26 and a control terminal connected to a combination generator 32. The movable arm c of the each switch is normally coupled to the upper contact a as shown in the drawing and selectively coupled to the lower contact b in response to a control pulse from the combination generator 32. The adder circuit 30 serves to sum the incoming signals and apply a total weight indicating signal to a judging circuit 34.

Figure 3:
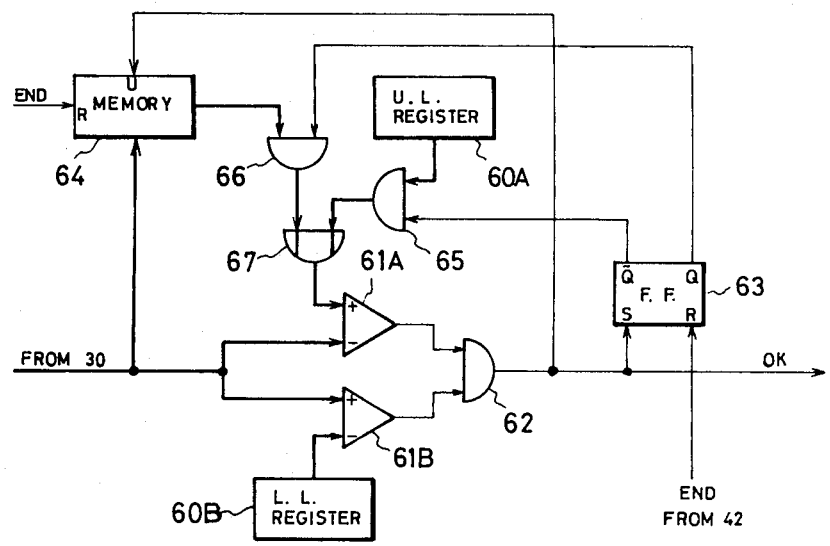
FIG. 3 is a block diagram representing an embodiment of the judging circuit in FIG. 2.
Figure 4:
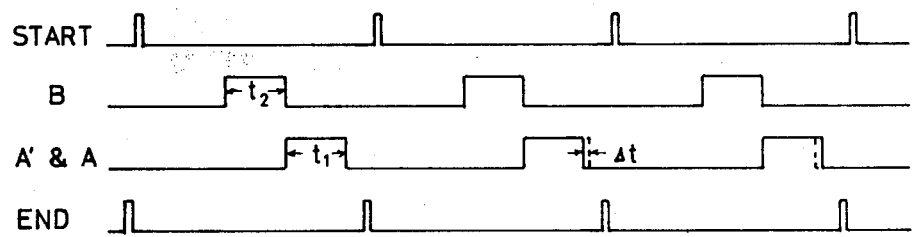
FIG. 4 is a signal waveform diagram presented for aiding of explaining operation of the circuit of FIG. 2.

An example of the judging circuit 34 is shown in FIG. 3. The circuit 34 includes upper and lower limit registers 60A and 60B in which the upper and lower limits of a predetermined allowable range of weight can be preset, respectively, by means of a digital keyboard, for example. The circuit 34 also includes a pair of comparators 61A and 61B coupled to receive the contents of the registers 60A and 60B at their first inputs, respectively, and the total weight signal from the adder 30 at their second inputs. The first comparator 61A is arranged to produce an output signal when its first input signal is greater than its second input signal, while the second comparator 61B is arranged to produce an output signal when its first input signal is less than its second input signal. The outputs of the comparators 61A and 61B are coupled to both inputs of an AND gate 62 whose output signal, which will be preferred to hereinunder as the "OK signal", is coupled to set input S of a flip-flop circuit 63 and update input U of a memory 64 and also supplied to external circuits as described later. The memory 64 is coupled to receive the total weight signal from the adder 30 and arranged to update its content with the current input signal in response to the OK signal at its update input U. The outputs of the upper limit register 60A and the memory 64 are coupled to the first comparator 61A through separate AND gates 65 and 66 and a common OR gate 67, while the output of the lower limit register 60B is coupled directly to the second comparator 61B. The Q and $\bar{Q}$ outputs of the flip-flop 63 are coupled respectively to the second inputs of the AND gates 66 and 65, and the reset input of the flip-flop 63 is coupled to receive an END signal produced by a control signal generator 40 (FIG. 2) at the end of each cycle of operation as shown in FIG. 4.

At the beginning of each cycle of operation, therefore, the flip-flop 63 is in reset condition and the AND gate 65 is opened by its high level $\bar{Q}$ output signal to couple the upper limit register 60A to the comparator 61A. Accordingly, when the total weight signal supplied from the adder 30 to both the comparators 61A and 61B falls between the upper and lower limits stored respectively in the upper and lower limit registers 60A and 60B, the AND gate 62 will produce an OK signal. Then, the OK signal is applied to the update input U of the memory 64 to cause it to store this total weight signal. The OK signal is also applied to the set input S of the flip-flop 63 to set it, thereby closing the AND gate 65 and opening the AND gate 66. Thus, the content of the memory 64 is applied through the gates 66 and 67 to the comparator 61A as a new upper limit, while the lower limit is unchanged. If another total weight signal falling between these new limits comes into the judging circuit 34 in this condition, the AND gate 62 will produce an OK signal to cause the memory 64 to update its content with this new weight signal. In the same manner, the content of the memory 64 is successively substituted with the subsequent input signal which is less than itself and gradually approaches the lower limit preset in the resistor 60B. Thus, at the end of each cycle of operation, just before the memory 64 is cleared by the END signal at its reset input R, it stores a total weight which is within the predetermined range of weight and also nearest of all to the lower limit thereof.

Returning to FIG. 2, the control terminals of the changeover switches $28_1$, $28_2$, . . . $28_n$ are coupled respectively to n-number of output terminals of combination generator 32. The combination generator 32 is actuated by a START signal applied periodically from the control signal generator 40 as shown in FIG. 2 and driven by a train of clock pulses from a clock pulse generator included therein to produce a predetermined set of combinations of output pulse signals from its selected output terminals. For example, if the predetermined set of combinations are complete mathematical combinations of the n-number of outputs, the combination generator 32 may be an n-bit binary counter having a control clock input and n-number of parallel outputs corresponding to its output terminals, respectively. In this case, logic HIGH level or binary "1" will serve as the output signal from each output terminal of the combination generator 32. As well known in the art, the total number of such combinations is $2^n - 1$ and the combination generator 32 will produce ($2^n - 1$) sets of output signals successively in synchronism with the applied clock pulse train. Thus, the weight indicating signals $W_1$, $W_2$, . . . $W_n$ from the weight sensors $26_1$, $26_2$, . . . $26_n$ are successively applied to the adder 30 in accordance with these combinations.

The output signals of the combination generator 32 are also supplied successively to a combination memory 36 having corresponding input and output terminals. The combination memory 36 is also coupled to receive the OK signal from the judging circuit 34 and the END signal from the control signal generator 40, and arranged to update its content with the current set of input signals in response to the OK signal at the same time as the memory 64 (FIG. 3) updates its content and to clear its content in response to the END signal. Accordingly, the combination memory 36 stores the selected combination of weighing units which provide the optimum total weight of articles stored in the memory 64 at the end of each cycle of operation.

In addition to the START and END signals, the control signal generator 40 provides loading and unloading gate control signals A' and B timed as shown in FIG. 4. Pulse durations $t_1$ and $t_2$ of these signals can be preset by means of loading and unloading time presetters 42 and 44, respectively. In FIG. 4, the loading gate control signal A' indicated in solid lines is modified in duration by $\Delta t$ in a duration control circuit 46 to become an effective loading gate control signal A, as described later. The combination memory 36 is also arranged to discharge its content in response to the signal B for a length of time equal to the duration $t_2$ and to clear its content in response to the END signal. The discharged content of the memory 36 is applied as the effective unloading gate control signals $B_1$, $B_2$, . . . $B_n$ to the selected weighing units to open their unloading gates 20 (FIG. 1) and also to a second combination memory 38 to be stored therein. The combination memory 38 is arranged to discharge its content in response to the signal A for a length of time equal to its variable duration $t_1 + \Delta t$ and to clear its content in response to the END signal. The discharged content of the memory 38 is applied as the effective loading gate control signals $A_1$, $A_2$, . . . $A_n$ to the selected weighing units to open their loading gates 16 (FIG. 1).

While the weight signals of the selected weighing units are applied to the adder 30, those from the remaining non-selected weighing units are applied to the averaging circuit 50. The averaging circuit 50 serves to calculate a mean value of the incoming weight signals and, as such a circuit is well known in the art, it need not be described further. The output mean value indicating signal of the averaging circuit 50 is applied through a gate circuit 52 having a control input for receiving the OK signal from the judging circuit 34, to a subtracter 54 having another input coupled to a reference load register 56 in which a predetermined reference load is preset by means of digital keyboard, for example. The reference load is the optimum weight or articles in the each weighing cradle 18 (FIG. 1) and may be selected for example in accordance with the principle as described in the aforementioned Hirano application Ser. No. 277,617. According to this principle, the reference load $W_{ref}$ can be indicated as $W_{ref}=2W_T/n$, where $W_T$ is the intended target total weight of articles in each pack or sub-group and n is the number of weighing units in the machine.

The subtracter 54 subtracts the mean weight signal from the averaging circuit 50 from the reference load $W_{ref}$ preset in the register 56 to apply a (positive or negative) difference signal to a memory 48. The memory 48 is arranged to receive the OK signal from the judging circuit 34 and update its content with the current input siganl in response to the OK signal, and also to receive the END signal from the control signal generator 40 to clear its content in response to the END signal. The updated content of the memory 48 is applied to the duration control circuit 46 which serves to add (or subtract) a controlled amount of time $\Delta t$ to (or from) the preset duration $t_1$ of the loading gate control signal A' as described previously in conjunction with FIG. 4. The value $\Delta t$ varies as a function of the difference weight supplied from the memory 48 and this function is previously determined experimentally or experience. For example, if the difference is positive, the duration of the loading gate control signal is increased to increase the amount of articles fed subsequently to the selected or discharged weighing units. That is to say, any non-selected weighing unit carrying too small a load is provided with a chance of participating in the optimum combination in the next cycle by increasing the load of the each selected weighing unit, and vice versa. The abovementioned function giving $\Delta t$ may be not only a linear function but also its modification or other suitable one. The duration control circuit 46 may be any suitable one which is known in this field as a timing control circuit.

It is to be noted that the above description has been made for illustrative purpose only and various modifications and changes can be made by those skilled in the art within the scope of this invention as defined in the appended claims. For example, in order to control the amount of articles fed to the selected weighing units, amplitude of vibration of the vibration feeder 10 (FIG. 1) may be controlled instead of controlling the loading gates 16. The judging circuit of FIG. 3 is designed for the user's convenience or advantage so that the total weight is as near as possible to the lower limit of the allowable range of weight. However, the circuit configuration of this circuit can be selected suitably as occasion demands. Some other examples of the judging circuit are shown in the copending U.S. application Ser. No. 323,951 filed Nov. 13, 1981. The reference load $W_{ref}$ may be of other value than $2W_T/n$.

I claim:

1. A combination weighing machine, comprising a plurality of weighing units for weighing a plurality of articles each and producing weight indicating signals respectively, combination selecting means for summing said weight indicating signals in accordance with a predetermined set of combinations and electing a combination the total weight of which meets a predetermined qualification, and an automatic feeding device for feeding the articles to said respective weighing units; wherein said machine further comprises means for averaging those weight indicating signals which do not belong to said elected combination to produce a mean weight indicating signal every cycle of operation, and means for calculating the difference between said mean weight and a predetermined reference weight and controlling the feeding rate of said feeding device based upon said difference.

2. A combination weighing machine, according to claim 1, wherein said combination selecting means comprises a combination generator for producing control pulses corresponding to said respective weighing units in accordance with said predetermined set of combinations, a plurality of double-throw switches each having a movable arm coupled to the output of a respective weighing unit and connected to a second contact in response to said control pulse while it is connected normally to a first contact, and a summing circuit coupled to said second contacts of said switches for calculating a sum of the incoming signals, and said averaging means include an averaging circuit coupled to said first contacts of said switches for calculating a mean value of the incoming signals.

3. Combination weighing apparatus comprising a plurality of weighing units, means for feeding product to said units at a variable rate, means for determining the values of combinations of weights on said units to select a combination of units to be unloaded to deliver an acceptable weight quantity, means operable on each cycle of operation to determine the average of the weights on the non-selected units, and means for varying the rate of feed of product by said feeding means in accordance with variations in said average.

* * * * *